2,809,985
BIS-CYANOETHYLATED ANILINES

Saul R. Buc, Easton, Pa., assignor to General Aniline & Film Corporation, New York, N. Y., a corporation of Delaware No Drawing. Application April 10, 1956,
Serial No. 577,201

4 Claims. (Cl. 260—465)

The present invention relates to a new class of bis-cyanoethylated anilines useful as intermediates in the preparation of anthraquinone dyes.

The new class of intermediates are characterized by the following general formula:

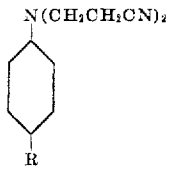

wherein R is either amino or nitro group. They are readily prepared by condensing 1 mole of p-nitroaniline with 2 moles of acrylonitrile in the presence of an inert solvent-diluent, such as dioxane, and in the presence of an alkaline condensing agent such as trimethyl benzyl ammonium hydroxide. The amount of alkaline condensing agent is not critical and may range from 5 to 50 parts per 100 parts of acrylonitrile. The amount of inert solvent-diluent is immaterial so long as a sufficient amount is employed to permit stirring of the reaction mixture. Further details regarding the condensation reaction will become clearly manifest from the following working examples:

Example I

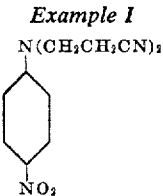

In a flask equipped with a stirrer, there were charged 69 grams of p-nitroaniline and 300 ml. of dioxane. The charge was stirred until dissolved, and then to it were added 5 ml. of trimethyl benzyl ammonium hydroxide followed by dropwise addition of 150 ml. of acrylonitrile. The temperature rose spontaneously to 40° C. The condensation reaction was maintained at this temperature by cooling until the spontaneous temperature rise was over. The reaction mixture was then allowed to stand over night, the crystalline yellow product filtered and washed with a little cold dioxane. The yield obtained was 85.0 grams of bis-cyanoethylated 4-nitroaniline melting sharply at 163–164° C. A sample was crystallized from ethylene chloride for analysis which showed it definitely to be the bis-cyanoethylated product.

Attempts to carry out the reaction using acrylonitrile as a solvent in the absence of dioxane gave an uncontrollable violent reaction which nevertheless yielded some product. Attempts to prepare a mono-cyanoethylated derivative were unsuccessful. It was surprising that neither o- nor m-nitroaniline could be dicyanoethylated under the reaction conditions of the preceding example. However, attempts to prepare a mono-cyanoethylated derivative were unsuccessful.

Example II

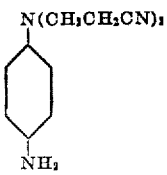

75 grams of the product of Example I were added gradually with stirring to a suspension of 75 grams of iron filings in 225 ml. of water containing 1.0 ml. of acetic acid at 90° C. When the addition was complete and heat was no longer evolved the mixture was neutralized with excess calcium carbonate and filtered. The product, an oil which could not be crystallized was isolated by extraction with an immiscible solvent (such as chloroform) and distillation of the solvent.

It is to be noted that in the reduction of the nitro product of Example II to the corresponding amine, iron may be replaced by 1.5 molecular equivalents of sodium sulfide, sodium hydrosulfide, ammonium sulfide, and the like in aqueous suspension at a temperature of 70–100° C. for a period of time ranging from ½ to 1½ hours. The reaction is allowed to cool to room temperature and the amine derivative isolated. Instead of sodium sulfide or sodium hydrosulfide, ammonium sulfide, etc., an equivalent amount of glucose or other reducing sugar may be used, and the reaction conducted in aqueous alkaline suspension at a temperature of 65–75° C. for about ½ to 1 hour. The bis-cyanoethylated amino aniline of Example II is valuable as an intermediate in the preparation of anthraquinone dyes. For example, the intermediate may be condensed with 4,5-dinitrochrysazine or 4,8-dinitroanthrarufin by refluxing in the presence of an inert solvent such as nitrobenzene, o-dichlorobenzene, and the like, in the conventional manner. The resulting dyestuff possesses three to four times as much affinity, i. e. substantivity for cellulose acetate than in previously anthraquinone dyes prepared by condensing either 4,5-dinitrochrysazine or 4,8-dinitroanthrarufin with p-amino acetanilide. The enhanced substantivity to cellulosic fabrics together with excellent light and gas fastness of the dyestuffs prepared while utilizing the intermediate of the present invention has been established to be due to the presence of two β-cyanoethyl groups on the nitrogen atom which bears the cyanoethylated radical. The bis-cyanoethylated anilines contribute exceptionally good affinity to cellulosic fibers when dyed with the anthraquinone dyestuff.

I claim:

1. Bis-cyanoethylated anilines having the following general formula:

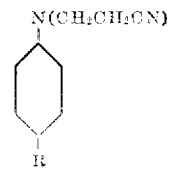

wherein R represents a member selected from the class consisting of amino and nitro groups.

2. A bis-cyanoethylated aniline having the following formula:

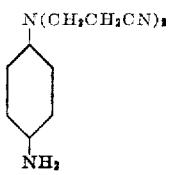

3. A bis-cyanoethylated aniline having the following formula:

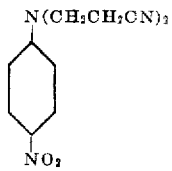

4. A process of preparing a bis-cyanoethylated aniline which comprises reacting 1 mole of para-nitro aniline with 2 moles of acrylonitrile in the presence of an inert solvent-diluent and in the presence of trimethyl benzyl ammonium hydroxide followed by reduction of the nitro-product to the corresponding p-amino bis-cyanoethylated aniline.

References Cited in the file of this patent

UNITED STATES PATENTS

| 2,579,580 | Howk et al. | Dec. 25, 1951 |
| 2,741,605 | Zwilgmeyer | Apr. 10, 1956 |

FOREIGN PATENTS

| 819,401 | Germany | Oct. 31, 1951 |

OTHER REFERENCES

Braunholtz et al.: J. Chem. Soc. (London) pgs. 1817–24 (1953).

Pietra: Gazz. Chim. Ital., vol. 86 (1956) pgs. 70–76.

UNITED STATES PATENT OFFICE

CERTIFICATE OF CORRECTION

Patent No. 2,809,985 October 15, 195

Saul R. Buc

It is hereby certified that error appears in the printed specification of the above numbered patent requiring correction and that the said Letter Patent should read as corrected below.

Column 2, line 54, claim 1, for that portion of the formula reading

"$\underset{|}{N}(CH_2CH_2CN)$" read -- $\underset{|}{N}(CH_2CH_2CN)_2$ --.

Signed and sealed this 4th day of February 1958.

(SEAL)
Attest:

KARL H. AXLINE
Attesting Officer

ROBERT C. WATSON
Commissioner of Patents